(12) United States Patent
Tateishi et al.

(10) Patent No.: US 7,469,471 B2
(45) Date of Patent: Dec. 30, 2008

(54) WORK ASSEMBLING AUXILIARY APPARATUS AND WORK ASSEMBLING METHOD

(75) Inventors: Takeya Tateishi, Sayama (JP); Taku Yokomukai, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 687 days.

(21) Appl. No.: 10/478,205

(22) PCT Filed: Sep. 4, 2001

(86) PCT No.: PCT/JP01/07654

§ 371 (c)(1),
(2), (4) Date: Mar. 11, 2005

(87) PCT Pub. No.: WO02/098602

PCT Pub. Date: Dec. 12, 2002

(65) Prior Publication Data

US 2005/0223545 A1    Oct. 13, 2005

(30) Foreign Application Priority Data

May 30, 2001    (JP) ............................. 2001-162355

(51) Int. Cl.
*B21K 3/00* (2006.01)
(52) U.S. Cl. ................ 29/888.01; 29/407.09; 29/407.1; 29/434; 29/700; 29/888.08
(58) Field of Classification Search .............. 29/888.01, 29/888.08, 6.01, 407.09, 407.1, 434, 799, 29/240, 700, 464, 468, 469, 281.1, 281.5; 173/1, 13, 148, 213, 165, 171; 464/162, 464/169
See application file for complete search history.

(56) References Cited

U.S. PATENT DOCUMENTS 3,400,956 A    9/1968  Buchwald
5,459,918 A  * 10/1995  Uchida et al. ................. 29/434

(Continued)

FOREIGN PATENT DOCUMENTS

EP    1 477 635 A    11/2004

(Continued)

*Primary Examiner*—Jermie E Cozart
(74) *Attorney, Agent, or Firm*—Arent Fox LLP

(57) ABSTRACT

A work-assembling auxiliary device for carrying out the matching of phases in the spline-coupling of a main shaft Sm of a transmission T to a crankshaft Sc of an engine E includes an output shaft 40 radially movably connected through an Oldham coupling 41 to an input shaft 30 connected to and rotated by a drive source. A chamfer 61*a* is provided at a tip end of a socket 61 mounted on the output shaft 40, and in inserting the socket 61 into a socket hole h in a crank pulley Pc, the output shaft 40 is smoothly aligned with the crankshaft Sc by the action of the chamfer 61*a*. Further, when the output shaft 40 is reciprocally rotated, the phases of the socket 61 and the socket hole h are smoothly matched with each other, whereby the engagement of the socket 61 and the socket hole h is achieved. Thus, even if a somewhat deviation exists between an axis of the crankshaft Sc of the engine E and an axis of the output shaft 40 of the work-assembling auxiliary device, the socket 61 of the output shaft 40 can be reliably engaged into the socket hole h in the crankshaft Sc.

4 Claims, 15 Drawing Sheets

U.S. PATENT DOCUMENTS 5,974,650 A * 11/1999 Kawabata et al. ............. 29/468

FOREIGN PATENT DOCUMENTS

| JP | 63034035 A | * | 2/1988 |
| JP | 63034036 A | * | 2/1988 |
| JP | 63034038 A | * | 2/1988 |
| JP | 2-48134 | | 2/1990 |
| JP | 3-37865 | | 8/1991 |
| JP | 5-138456 | | 6/1993 |
| JP | 6-53033 | | 7/1994 |
| JP | 06206124 A | * | 7/1994 |
| JP | 8-39367 | | 2/1996 |
| JP | 8-216081 | | 8/1996 |
| JP | 2000-42850 | | 2/2000 |
| JP | 2000-136818 | | 5/2000 |

* cited by examiner

WORK ASSEMBLING AUXILIARY APPARATUS AND WORK ASSEMBLING METHOD

CROSS-REFERENCE TO RELATED APPLICATION

This application is a National Stage entry of International Application No. PCT/JP01/07654, the entire specification claims and drawings of which are incorporated herewith by reference.

FIELD OF THE INVENTION

The present invention relates to a work-assembling auxiliary device including an engage means capable of being brought into engagement with a to-be-engaged means provided in a rotary shaft of a work body to transmit a rotating force of a drive means to the rotary shaft of the work body through the engage means and the to-be-engaged means, and to a work-assembling process for assembling an engine and a transmission in an assembling line.

BACKGROUND ART

One example of means for carrying out an assembling operation by rotating the rotary shaft of the work body to adjust the phase of the rotary shaft is a transmission-assembling station provided in a power unit-assembling line for an automobile. When an engine assembly and a transmission assembly assembled in the assembling line are to be integrally coupled to each other, an end of a main shaft of the transmission assembly is spline-coupled into a shaft hole in a crankshaft of the engine assembly. In this case, if the phase of a male spline of the end of the main shaft and the phase of a female spline of the shaft bore in the crankshaft are not matched with each other, the assembling of the transmission assembly and the engine assembly cannot be achieved. Therefore, it is necessary to match both of the phases with each other.

To carry out this operation, in a conventional engine and a transmission assembling apparatus described in Japanese Utility Model Publication No.3-37865, a socket is mounted at an end of an output shaft connected to a drive source for rotation, and in a state in which the socket is in engagement in a socket hole provided in an end of a crankshaft, the drive source is operated to continuously rotate the crankshaft in one direction, and a fitting auxiliary device is mounted on the transmission to match the phases of the socket and the socket hole.

In the above conventional assembling apparatus, however, the position of an axis of the output shaft provided with the socket is fixed and hence, if there is an error such as a looseness produced in position of the engine supported in a pallet, the socket mounted at the end of the output shaft cannot be smoothly brought into engagement in the socket hole provided in the end of the crankshaft. For this reason, it is necessary to match the phase of a male spline of the end of the main shaft with the phase of a female spline of the shaft bore in the crankshaft, and an operation for such matching is extremely troublesome. Moreover, in the conventional device, the crankshaft is continuously rotated in one direction and hence, an exclusive auxiliary device is required and for example, it is necessary to mount a swinging device on the transmission.

DISCLOSURE OF THE INVENTION

The present invention has been accomplished with the above circumstances in view, and it is an object of the present invention to ensure that even if a somewhat deviation exists between the axis of the to-be-engaged means provided in the rotary shaft of the work body and the axis of the engage means of the work-assembling auxiliary device, the engage means can be reliably brought into engagement with the to-be-engaged means. It is another object of the present invention to ensure that in spline-coupling the end of the crankshaft of the engine and the end of the main shaft of the transmission to each other, the matching of phases in the spline-coupling can be carried out easily and reliably.

To achieve the above object, according to a first aspect and feature of the present invention, there is provided a work-assembling auxiliary device including an engage means capable of being brought into engagement with a to-be-engaged means provided in a rotary shaft of a work body to transmit a rotational force of a drive means to the rotary shaft of the work body through the engage means and the to-be-engaged means, characterized in that the auxiliary device comprises an input shaft connected to the drive means, an output shaft having the engage means, a coupling for connecting the output shaft to the input shaft, so that the output shaft can be moved radially in parallel to the input shaft, a first repulsively biasing means for biasing the output shaft, so that the output shaft is lined up with the input shaft on the same axis, a second repulsively biasing means for biasing the engage means in a direction to engage the to-be-engaged means, and an engaging guide means provided on at least one of the engage means and the to-be-engaged means, the drive means causing the rotation of the input shaft through a predetermined angle and the stoppage of the input shaft for a predetermined time alternately and repeatedly.

With the above arrangement, when the engage means mounted at the end of the output shaft is moved to engage the to-be-engaged means provided in the end of the rotary shaft of the work body, the output shaft is lined up with the input shaft on the same axis by the action of the first repulsively biasing means. When the engage means is put into abutment against the to-be-engaged means, the engaging guide means provided on at least one of the engage means and the to-be-engaged means is guided to the other of the engage means and the to-be-engaged means. Therefore, a radial load aligning the output shaft with the rotary shaft is generated, whereby the output shaft is moved radially in parallel to the input shaft by the action of the coupling against the biasing force of the first repulsively biasing means and thus, the engage means is aligned automatically with the to-be-engaged means. At this time, if the phases of the engage means and the to-be-engaged means are matched unexpectedly with each other, the engage means can be engaged with the to-be-engaged means. However, in many cases, the engage means cannot be engaged with the to-be-engaged means due to the mismatching of their phases, and the second repulsively biasing means is compressed to generate a biasing force in a direction to permit the engagement of the engage means with the to-be-engaged means.

When the rotation of the input shaft through a predetermined angle and the stoppage of the member for a predetermined time are conducted alternately and repeatedly from this state by the drive means, a driving force is transmitted to the output shaft moved radially in parallel to the input shaft by the action of the coupling, and at the moment the phase of the engage means mounted on the rotating output shaft is matched with the phase of the to-be-engaged means, the engage means is engaged with the to-be-engaged means by the biasing force of the second repulsively biasing means. As described above, the engage means of the output shaft can be reliably engaged with the to-be-engaged means of the rotary shaft only by positioning the axis of the output shaft and the axis of the rotary shaft roughly rather than accurately, and moreover, the rotation of the input shaft can be reliably transmitted to the output shaft by the action of the coupling.

According to a second aspect and feature of the present invention, in addition to the first feature, the coupling includes a driving cylindrical member fixed to the input shaft, a follower cylindrical member fixed to the output shaft and opposed to the driving cylindrical member, a first guide pin fixed to the driving cylindrical member perpendicularly to the axis, a second guide pin fixed to the follower cylindrical member perpendicularly to the axis and the first guide pin, and a guide block through which the first and second guide pins are slidably passed.

With the above arrangement, even if the axis of the output shaft having the follower cylindrical member fixed thereto is deviated from the axis of the input shaft having the driving cylindrical member fixed thereto, the first guide pin mounted on the driving cylindrical member is slid in a slide block, and the second guide pin mounted on the follower cylindrical member perpendicularly to the first guide pin is slid in the slide block, whereby the rotation of the input shaft can be transmitted to the output shaft without hindrance.

According to a third aspect and feature of the present invention, in addition to the second feature, a plurality of the first guide pins and a plurality of the second guide pins are disposed in a plane perpendicular to the axis.

With the above arrangement, the plurality of first guide pins and the plurality of second guide pins are disposed in the plane perpendicular to the axis and hence, the swinging movements of the driving cylindrical member and the follower cylindrical member relative to the guide block can be limited to ensure the parallelism of the input shaft and the output shaft.

According to a fourth aspect and feature of the present invention, in addition to the second feature, the first repulsively biasing means includes two rods biased in a direction toward the axis by a spring, and two rollers mounted at tip ends of the rods to abut from the below against two different points on an outer peripheral surface of each of the driving cylindrical member and the follower cylinder member of the coupling for rolling movement, each of the rollers being put into abutment against the outer peripheral surfaces of both the driving cylindrical member and the follower cylinder member to permit the input shaft and the output shaft to be lined up with each other on the axis.

With the above arrangement, the first repulsively biasing means repulsively brings the two rollers into abutment against the outer peripheral surfaces of the driving cylindrical member and the follower cylinder member of the coupling. Therefore, when no radial load is applied to the output shaft, the output shaft and the input shaft can be lined up with each other on the axis against a force of gravity applied to the output shaft.

According to a fifth aspect and feature of the present invention, in addition to any of the first to fourth features, the drive means is driven by a hydraulic cylinder, and a hydraulic and pneumatic pressure converter for converting a pneumatic pressure into a hydraulic pressure is interposed between a pneumatic pressure source and the hydraulic cylinder.

With the above arrangement, the hydraulic and pneumatic pressure converter for converting the pneumatic pressure into the hydraulic pressure is interposed between the pneumatic pressure source and the drive means comprising the hydraulic cylinder. Therefore, the drive means can be driven at a constant speed irrespective of the magnitude of a load to prevent the rapid rotation of the output shaft. Moreover, an influence of a difference between the area of a piston of the hydraulic cylinder adjacent the output rod and the area of the piston on the side opposite from the output rod and other problems attendant on the compressibility of air can be eliminated by the action of the hydraulic and pneumatic pressure converter.

According to a sixth aspect and feature of the present invention, in addition to any of the first to fifth features, the work body is an engine; the rotary shaft is a crankshaft, and the to-be-engaged means is a socket hole defined at the center of a crank pulley.

With the above arrangement, the engage means can be brought into engagement in the socket hole defined at the center of the crank pulley mounted on the crankshaft of the engine, whereby the crankshaft can be rotated by the drive means.

According to a seventh aspect and feature of the present invention, in addition to the sixth feature, a torque converter is integrally provided at an end of the crankshaft of the engine opposite from the crank pulley, and in a state in which the engage means of the output shaft is in engagement in the socket hole in the crank pulley, a main shaft of a transmission is spline-coupled into a shaft bore in the torque converter, while rotating the crankshaft.

With the above arrangement, the main shaft of the transmission can be spline-coupled reliably into the shaft bore in the torque converter integrally provided at the end of the crankshaft opposite from the crank pulley by rotating the crankshaft by the drive means.

According to an eighth aspect and feature of the present invention, there is provided a work-assembling process for assembling an engine and a transmission in an assembling line, characterized in that the process comprises the steps of bringing an engage means connected to a drive means into engagement with a to-be-engaged means formed at one of ends of a crankshaft of an engine, and conducting the rotation of the crankshaft through a predetermined angle and the stoppage of the crankshaft for a predetermined time alternately and repeatedly by the drive means, thereby spline-coupling the other end of the crankshaft and an end of a main shaft of a transmission to each other.

With the above feature of the process, in bringing the engage means connected to the drive means into engagement with the to-be-engaged means formed at one of the ends of the crankshaft of the engine, and rotating the crankshaft by the drive means, thereby spline-coupling the other end of the crankshaft and the end of the main shaft of the transmission to each other, a phase-matching operation on the side of the spline of the main shaft can be smoothened by conducting the rotation of the crankshaft through a predetermined angle and the stoppage of the crankshaft for a predetermined time alternately and repeatedly.

According to a ninth aspect and feature of the present invention, in addition to the eighth feature, the crankshaft is rotated for reciprocation by the drive means.

With the above feature, the crankshaft is rotated for reciprocation by the drive means and hence, the phase-matching operation on the side of the spline of the main shaft can be simplified to smoothly achieve the spline coupling.

According to a tenth aspect and feature of the present invention, in addition to the eighth feature, the crankshaft is rotated intermittently in one direction by the drive means.

With the above feature, the crankshaft is rotated intermittently in one direction by the drive means and hence, the phase-matching operation on the side of the spline of the main shaft can be simplified to smoothly achieve the spline coupling.

Meanwhile, a follower shaft 30 in an embodiment corresponds to the input shaft of the present invention; an Oldham coupling in the embodiment corresponds to the coupling of the present invention; a follower cylindrical member-supporting means 63 in the embodiment corresponds to the first repulsively biasing means of the present invention; a spring 45 in the embodiment corresponds to a second repulsively biasing means of the present invention; a socket 61 in the embodiment corresponds to the engage means of the present invention; a chamfer 61a in the embodiment corresponds to the engaging guide means of the present invention; an engine E in the embodiment corresponds to the work body of the present invention; a socket hole h in the embodiment corresponds to the to-be-engaged means of the present invention; and a crankshaft Sc in the embodiment corresponds to the rotary shaft of the present invention.

BRIEF DESCRIPTION OF THE DRAWINGS

FIGS. 1 to 15 show an embodiment of the present invention, wherein FIG. 1 is a side view of a transmission-assembling line;

FIG. 2 is a view taken along a line 2-2 in FIG. 1;

FIG. 3 is a view taken along a line 3-3 in FIG. 2;

FIG. 4 is a view taken along a line 4-4 in FIG. 3;

FIG. 5 is an enlarged view of an essential portion shown in FIG. 2;

FIG. 6 is an enlarged view of an essential portion shown in FIG. 2;

FIG. 7 is a view taken in the direction of an arrow 7 in FIG. 6;

FIG. 8 is a sectional view taken along a line 8-8 in FIG. 6;

FIG. 9 is a view taken along a line 9-9 in FIG. 6;

FIG. 10 is a sectional view taken along a line 10-10 in FIG. 9;

FIG. 11 is a sectional view taken along a line 11-11 in FIG. 6;

FIG. 12 is a sectional view taken along a line 12-12 in FIG. 11;

FIG. 13 is a view taken in the direction of an arrow 13 in FIG. 11;

FIG. 14 is a diagram of a pneumatic pressure circuit for an engine and transmission assembling apparatus; and FIG. 15 is an illustration for explaining the operation.

DESCRIPTION OF THE PREFERRED EMBODIMENT

The present invention will now be described by way of an embodiment of the present invention with reference to the accompanying drawings.

Figure 1:
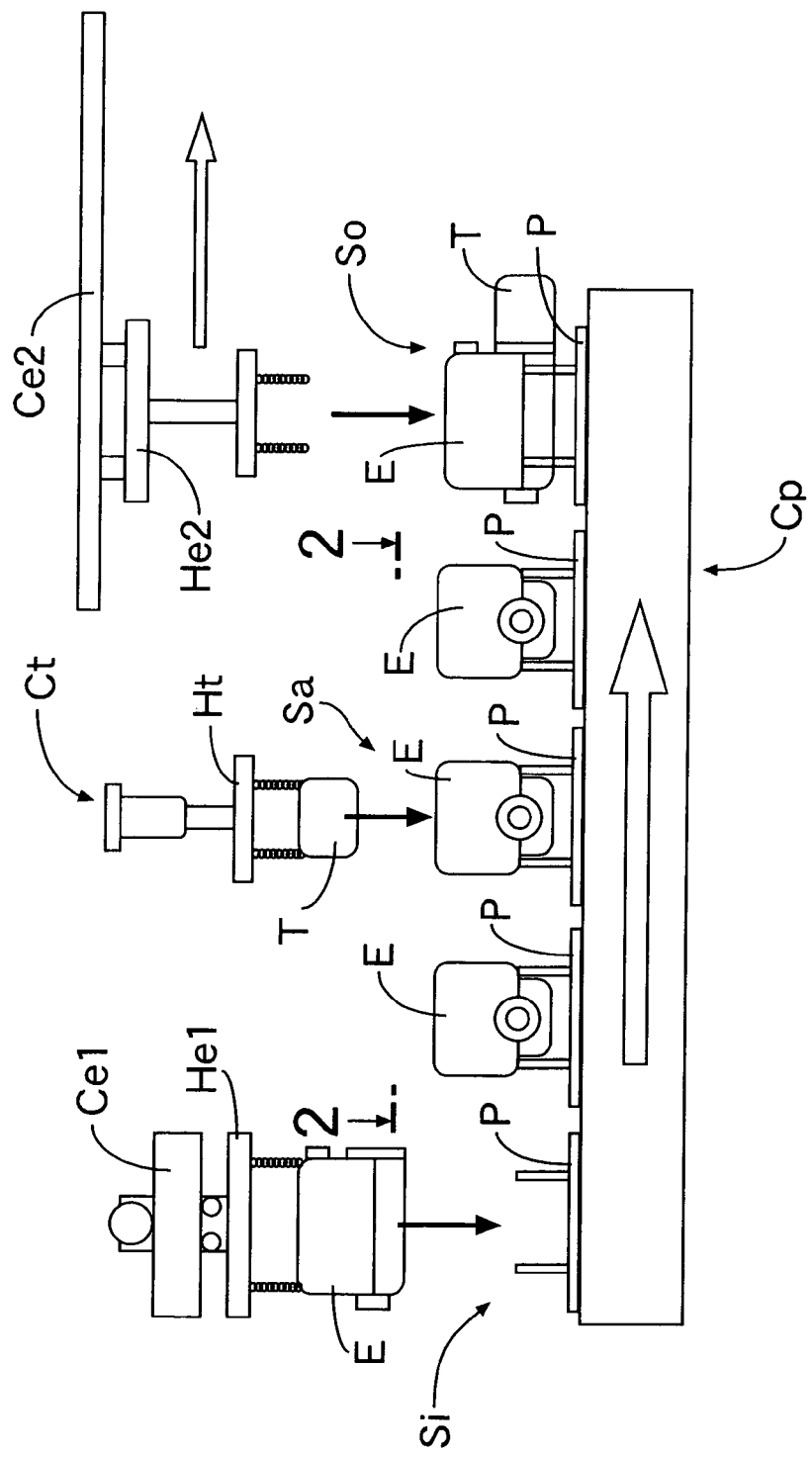
Figure 2:
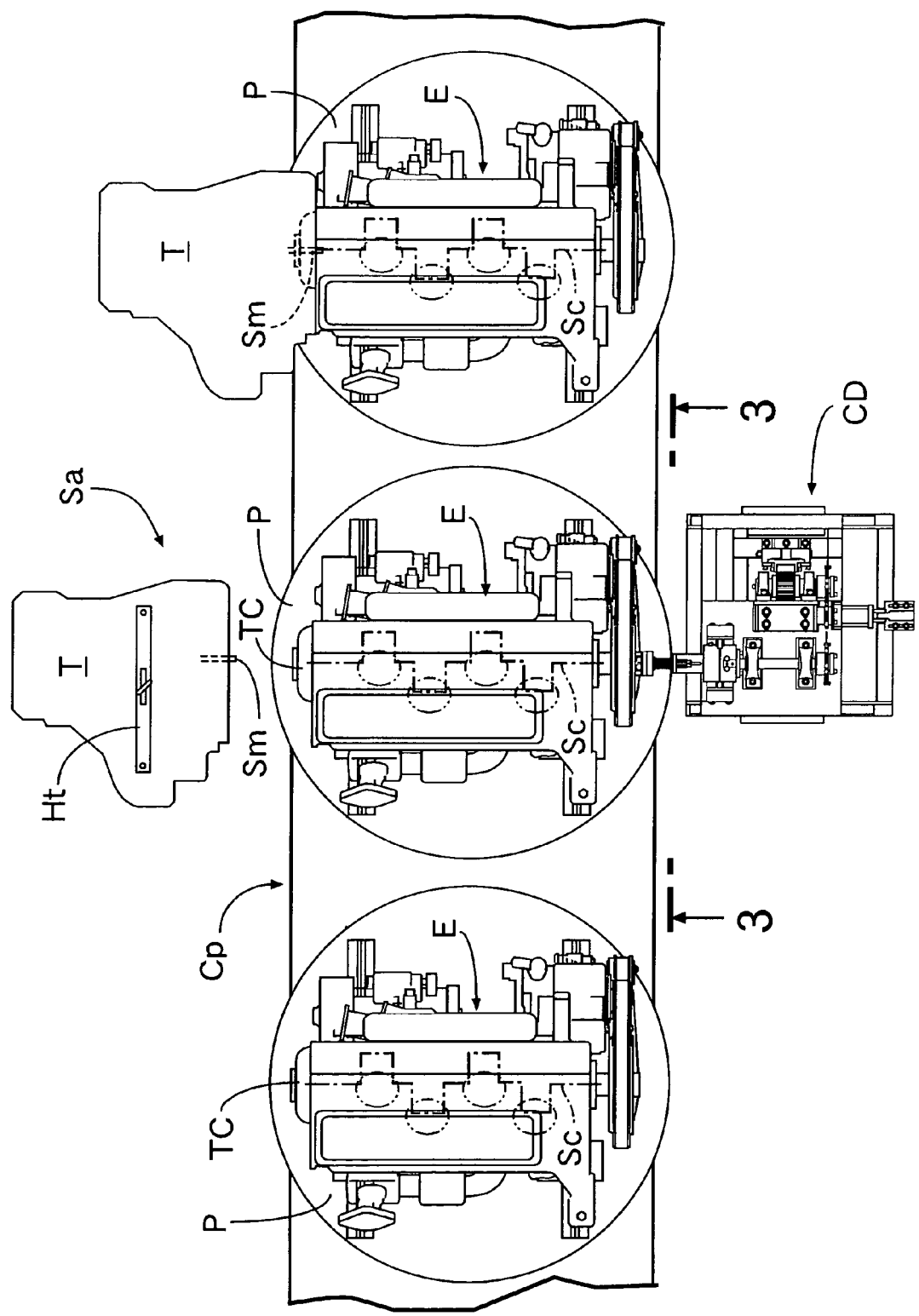
Figure 3:
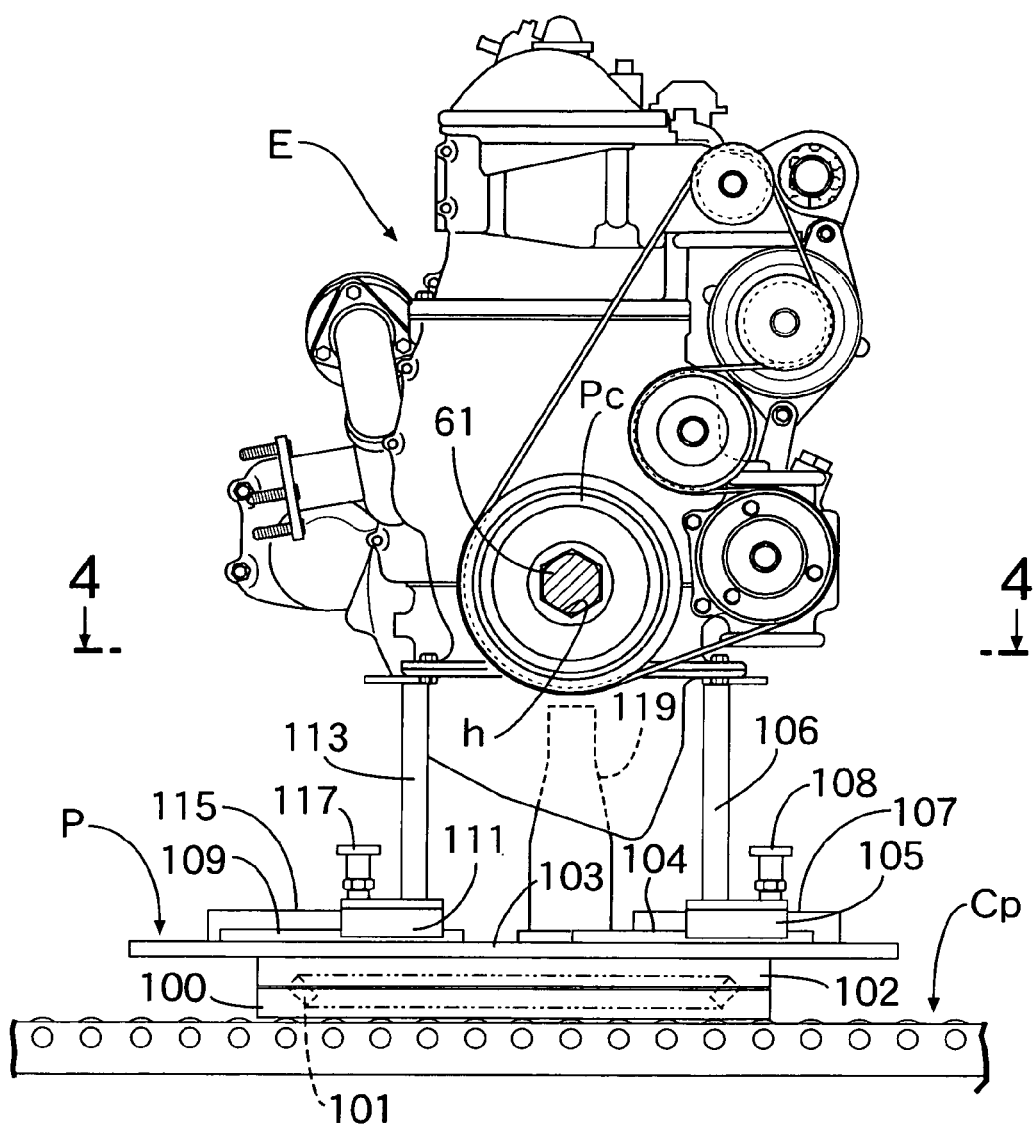
Figure 4:
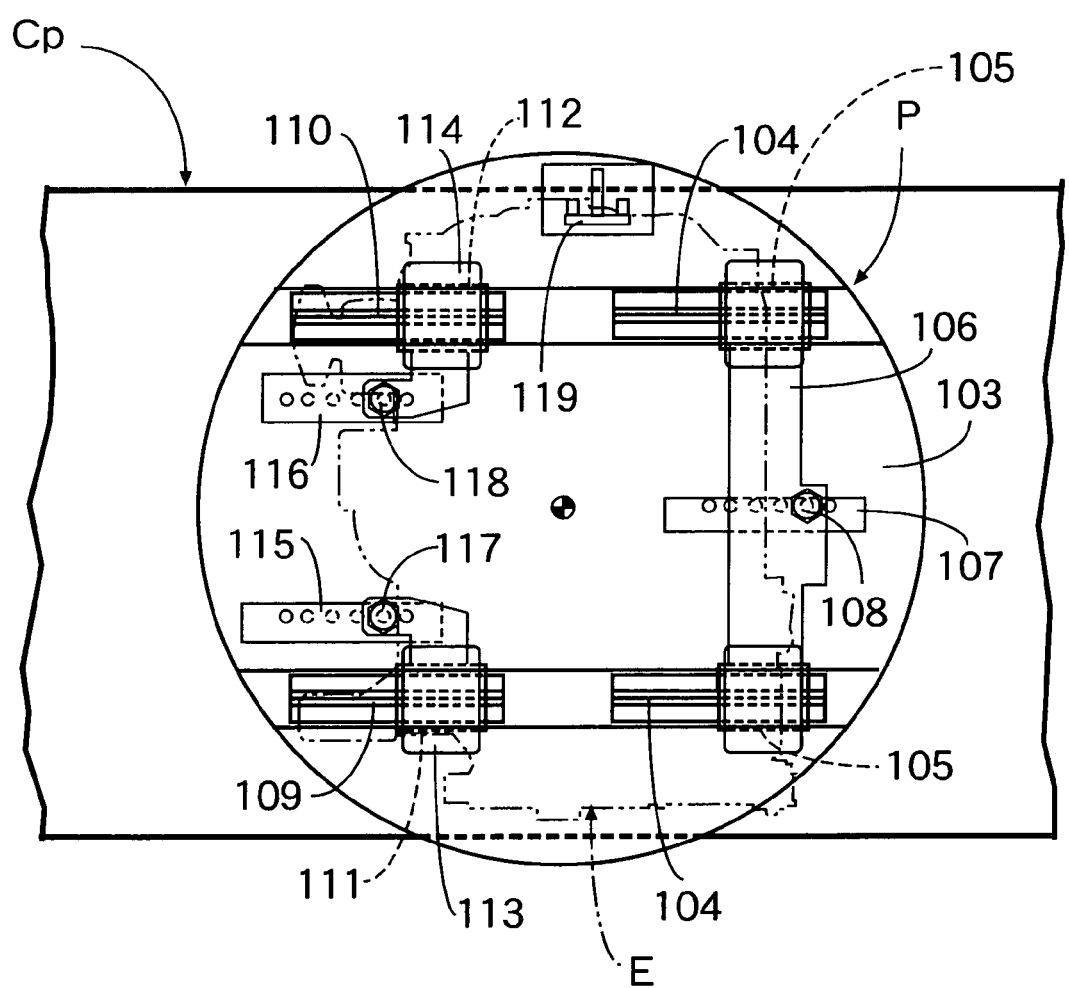
Figure 5:
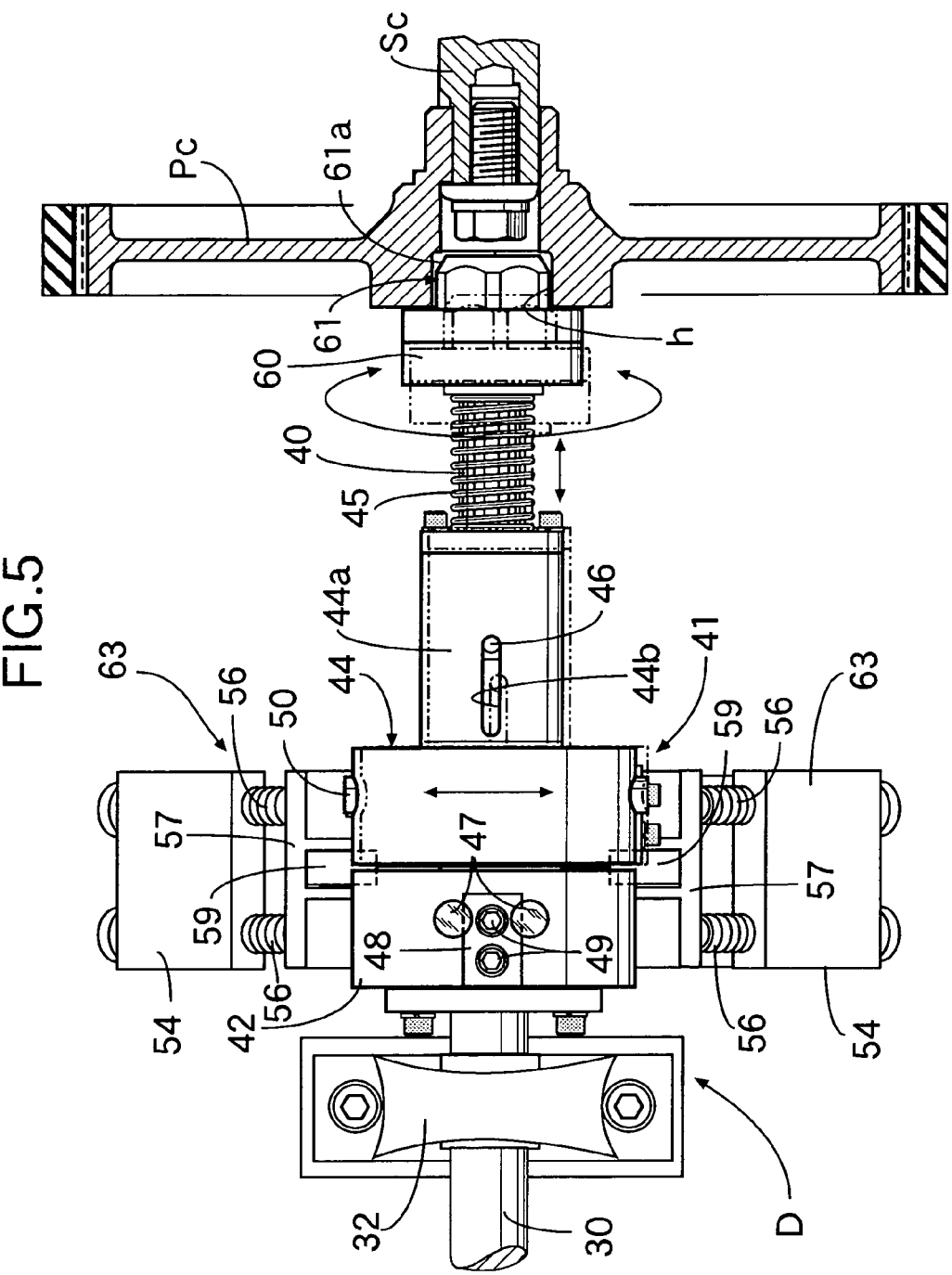
Figure 6:
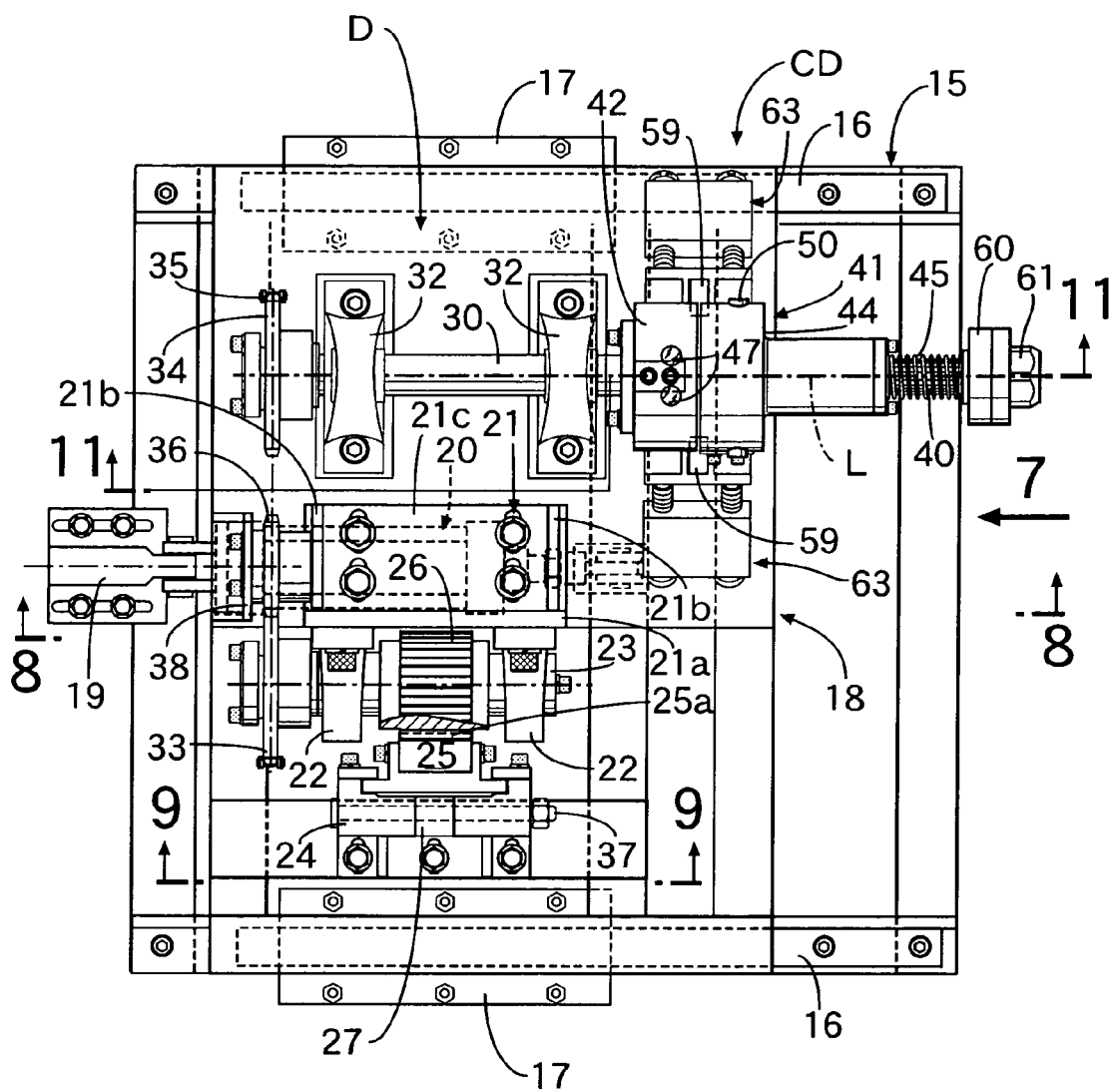
Figure 7:
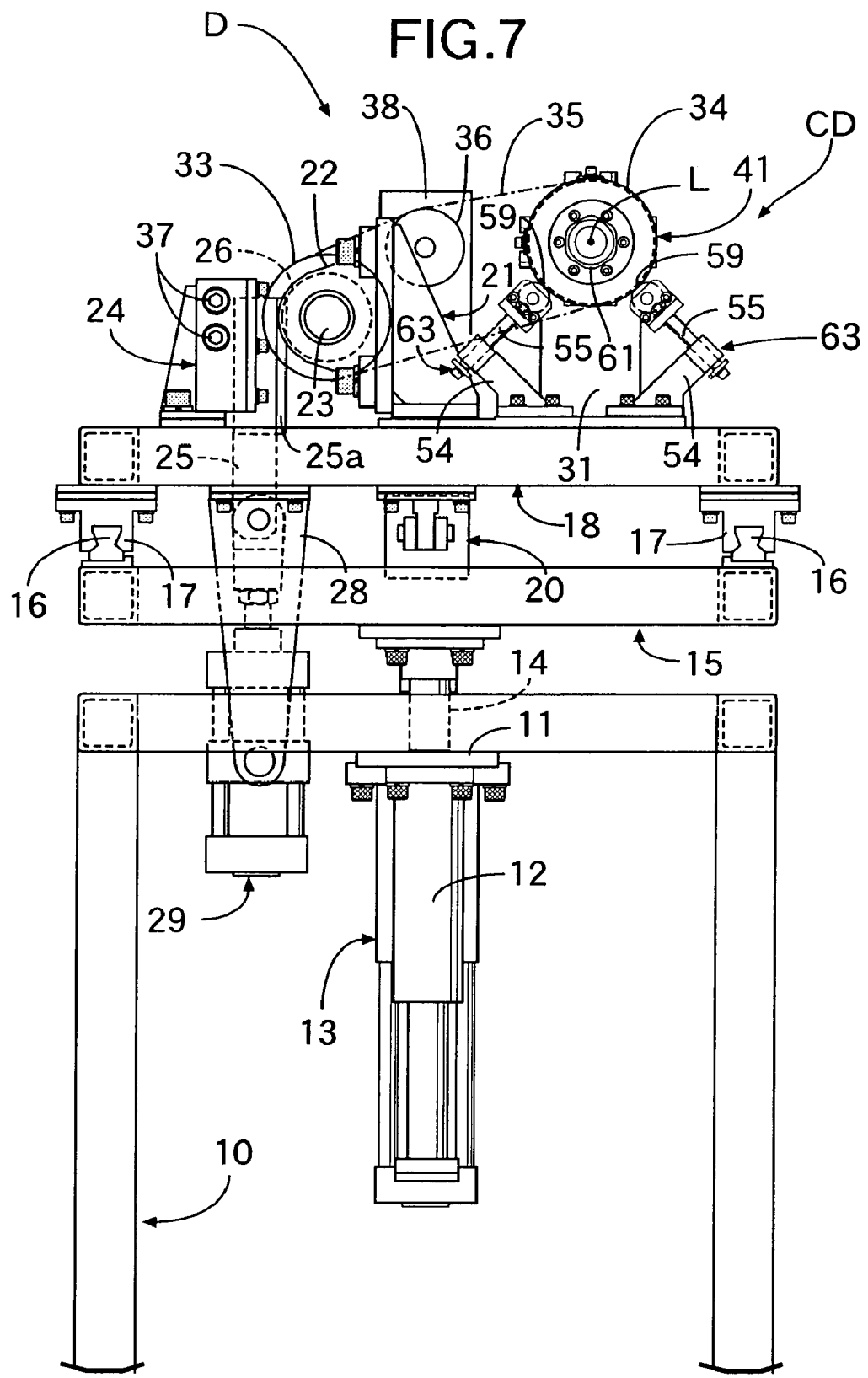
Figure 8:
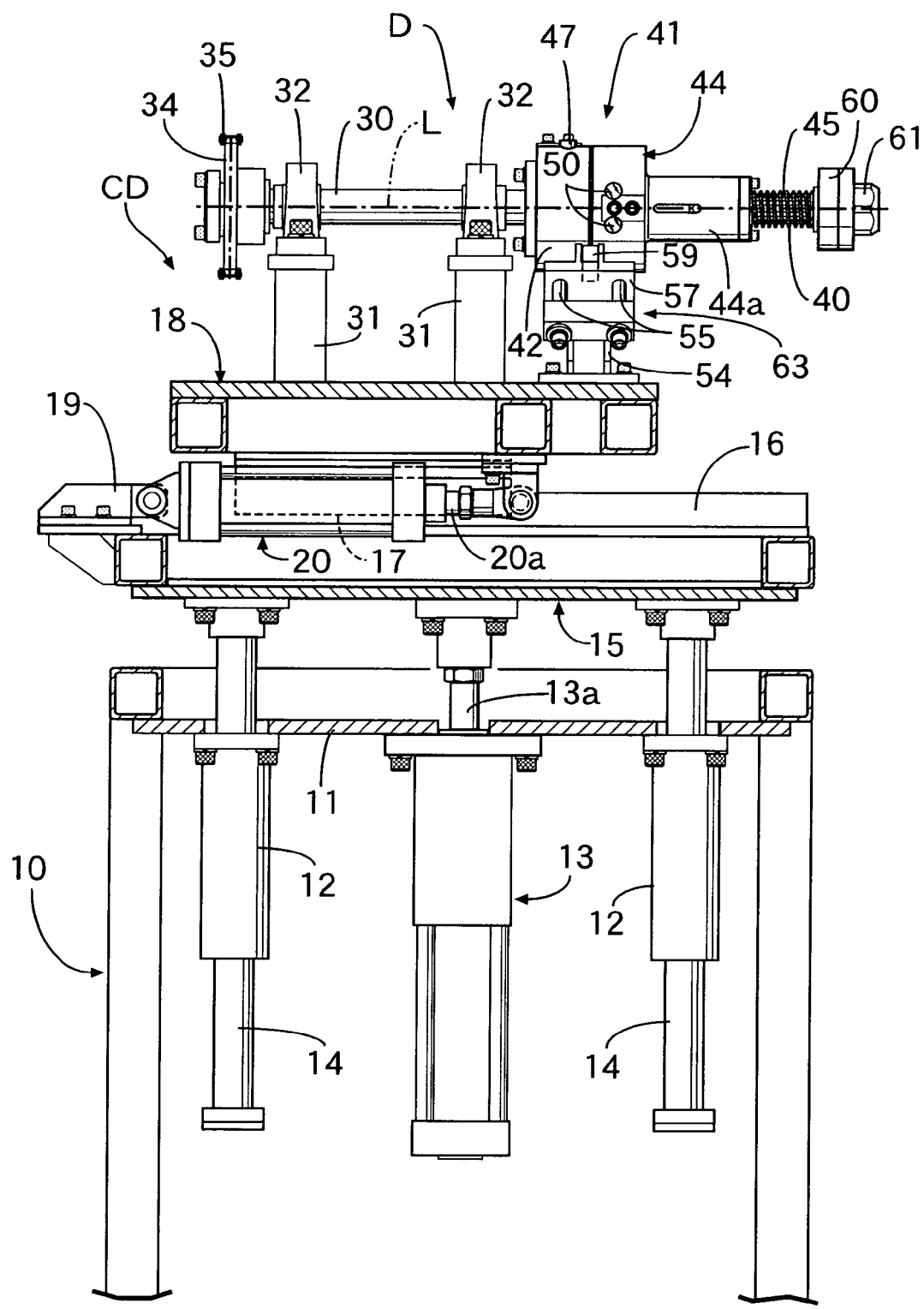
Figure 9:
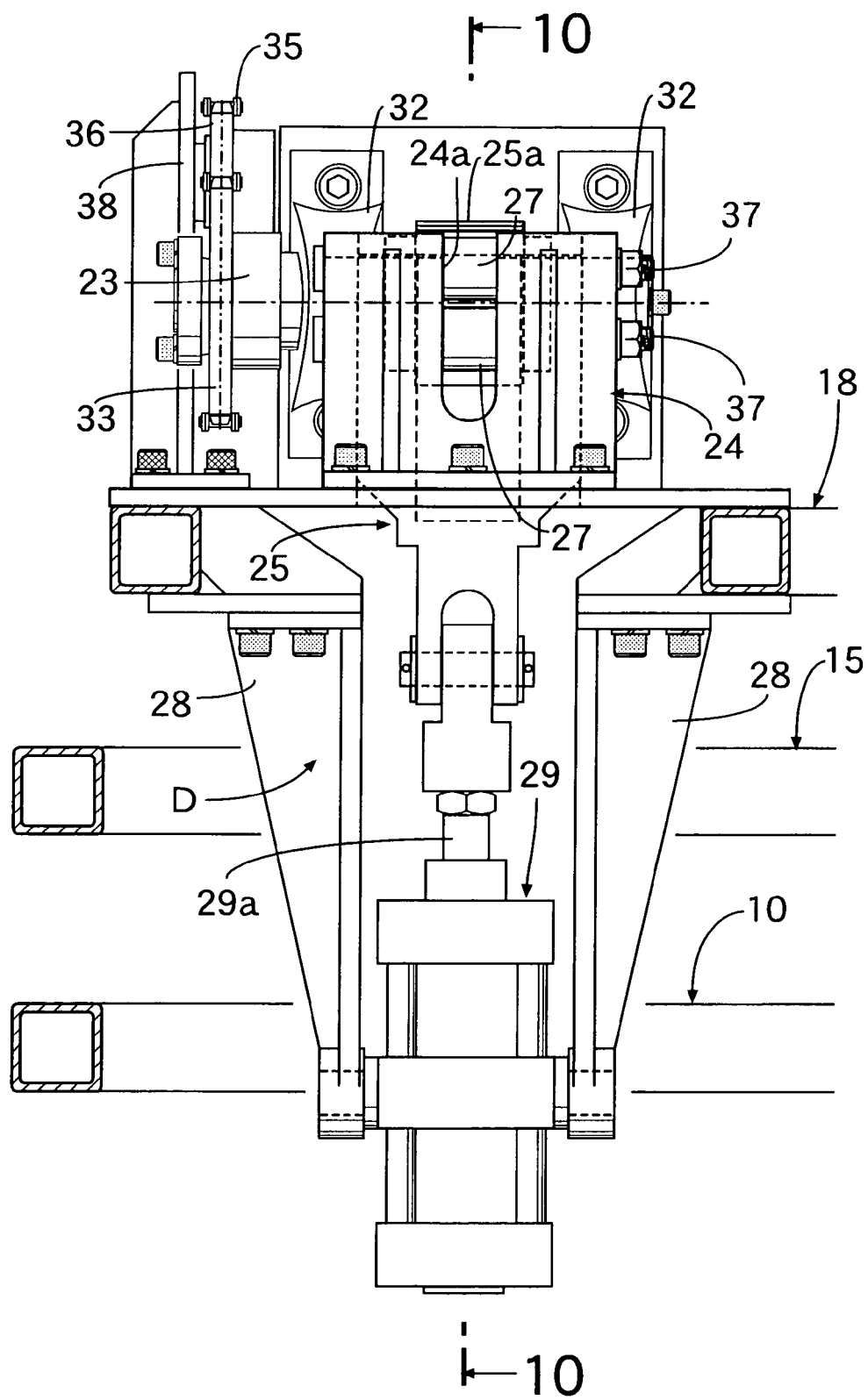
Figure 10:
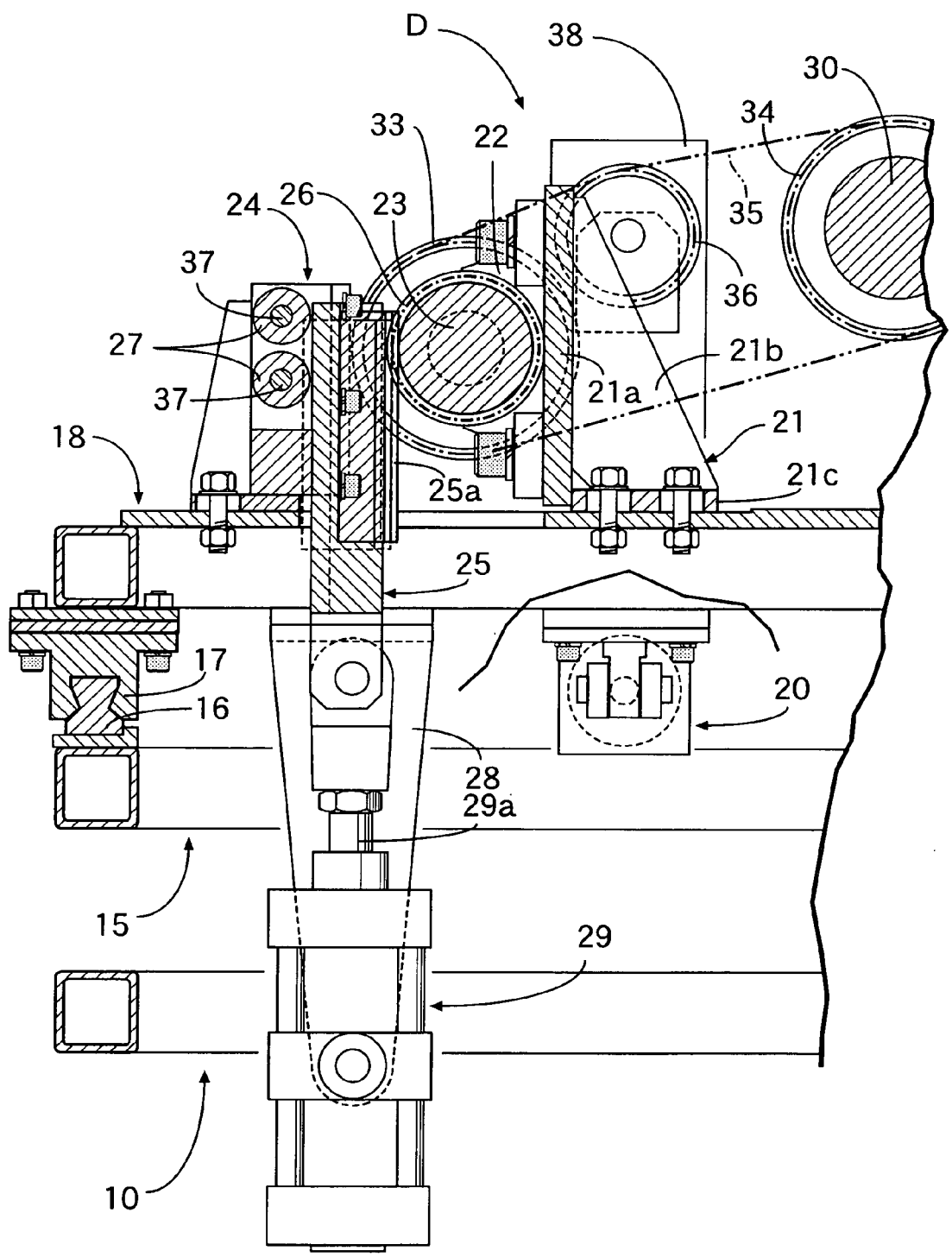
Figure 11:
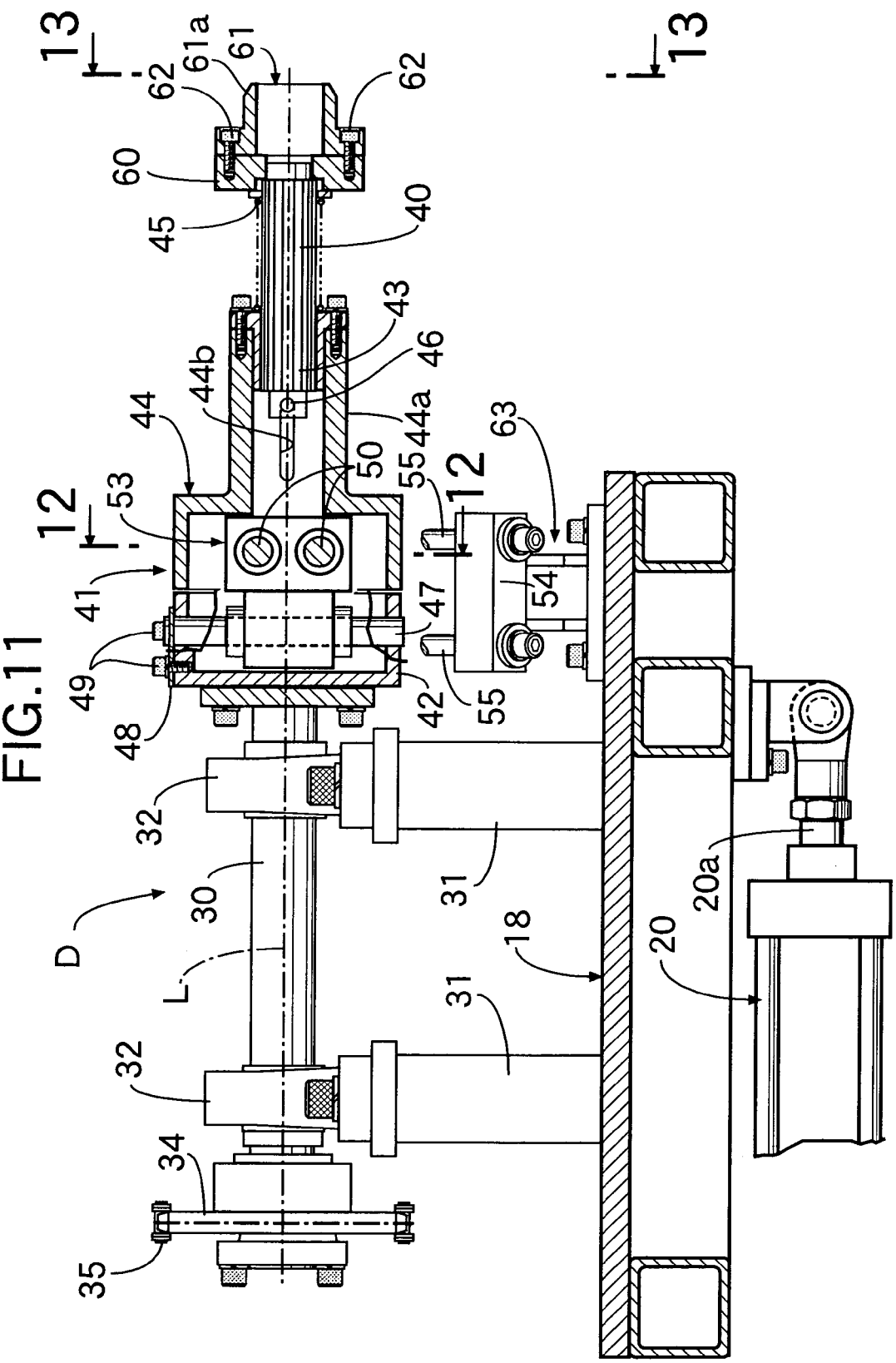
Figure 12:
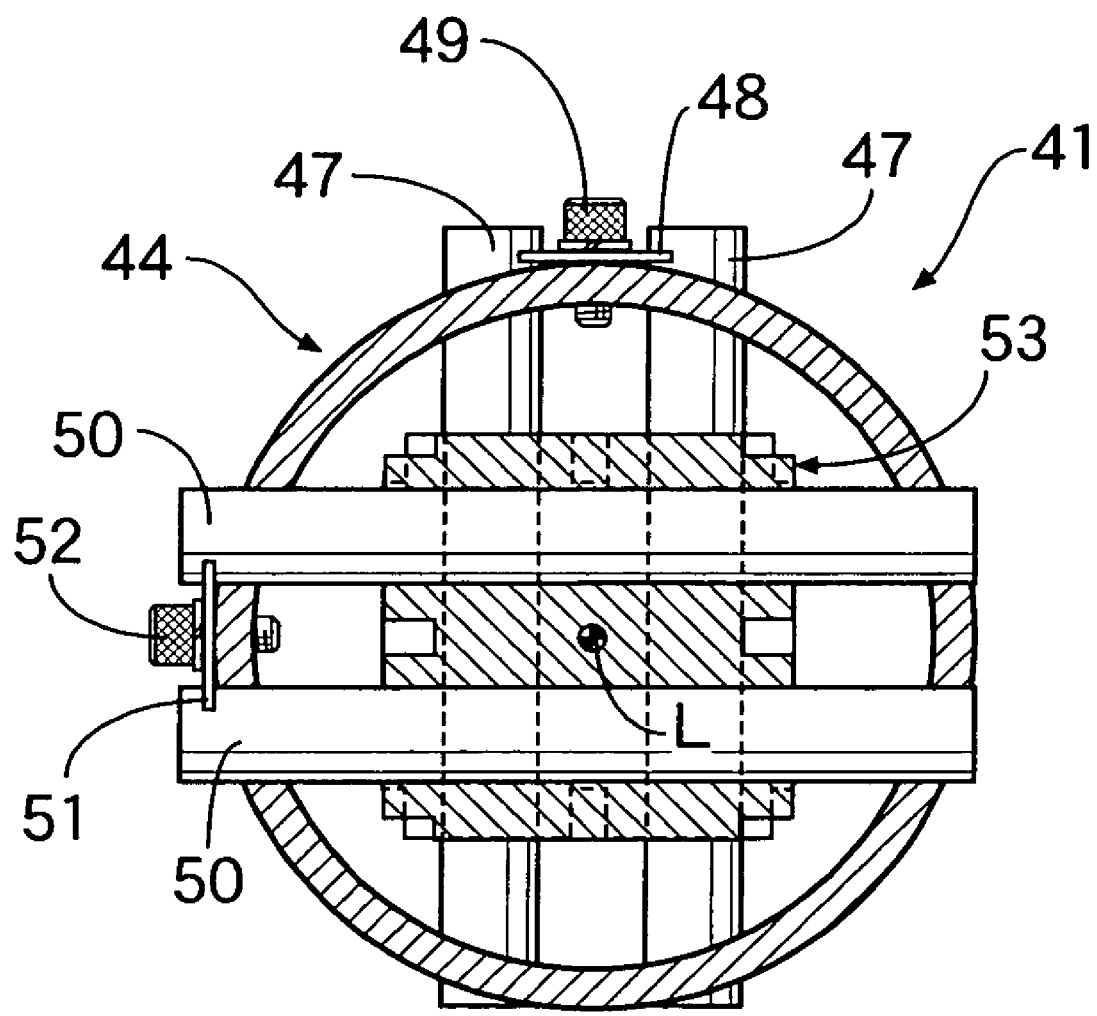
Figure 13:
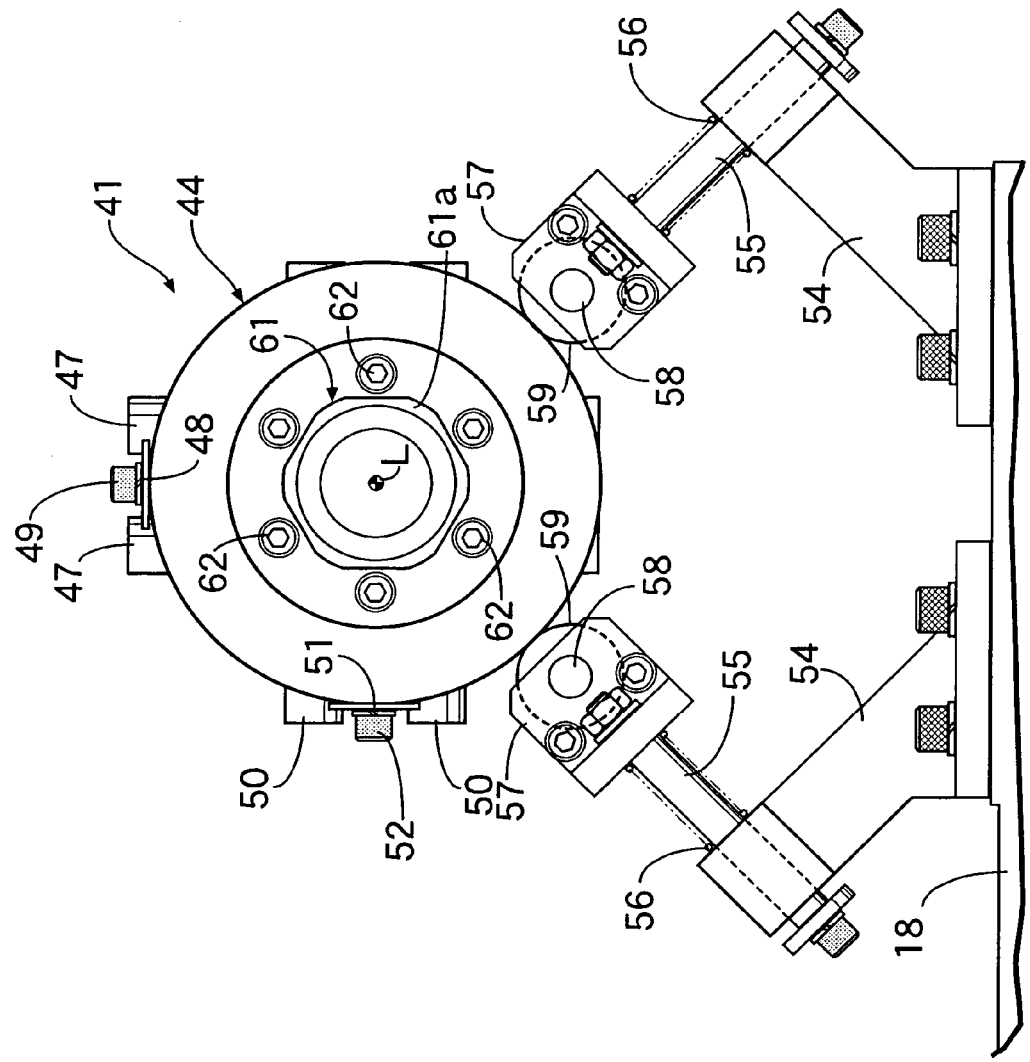

Referring to FIG. 1, a take-in station Si, a transmission-assembling station Sa and a take-out station So are provided in a transporting path in a pallet conveyor Cp for transporting a pallet P having an engine E placed thereon. An engine E assembled in an engine-assembling line is hung down by a hanger He1 of an engine taking-in overhead conveyor Ce1 and transported into the take-in station Si, where the engine E is transferred onto the pallet P on the pallet conveyor Cp. A transmission T assembled in a transmission-assembling line is hung down by a hanger Ht of a transmission taking-in overhead conveyor Ct and transported into the transmission-assembling station Sa, where the transmission T is assembled to the engine E. The engine E having the transmission T assembled thereto is transported to the take-out station So by the pallet conveyor Cp, where the engine E is turned about a vertical axis through an angle of 90°. Then, the engine E is hung by a hanger He2 of an engine taking-out overhead conveyor Ce2 and transported from the take-out station So.

As shown in FIGS. 2 to 5, in the transmission-assembling station Sa, an engine and transmission assembling device CD according to the present invention is disposed on one of sides of the transporting path in the pallet conveyor Cp, and the transmission T hung by the hanger Ht of the transmission taking-in overhead conveyor Ct is disposed on the other side of the transmitting path. A crankshaft Sc of the engine E is disposed in a direction perpendicular to a transporting direction of the pallet conveyor Cp, and a crank pulley Pc for driving various auxiliaries through an endless belt is mounted at an end of the crankshaft Sc opposed to the engine and transmission assembling device CD. A hexagonal socket 61 provided at an end of an output shaft 40 of the engine and transmission assembling device CD is engaged into a hexagonal socket hole h provided at the center of the crank pulley Pc (see FIG. 5).

An operator pushes the transmission T hung by the hanger Ht of the transmission taking-in overhead conveyor Ct, thereby inserting an end of a main shaft Sm of the transmission T into a shaft bore Tca in a torque converter TC mounted at an end of the crankshaft Sc of the engine E. When the engine and transmission assembling device CD is operated in this state to rotate the crankshaft Sc of the engine E, a male spline in the end of the main shaft Sm is matched in phase with a female spline in the shaft bore Tca in the torque converter TC, whereby the transmission T is coupled to the engine E (see FIG. 15).

The pallet P includes a lower member 100 placed on the pallet conveyor Cp, an upper member 102 rotatably supported on an upper surface of the lower member 100 with an angular roller bearing 101 interposed therebetween, and a circular base plate 103 fixed to an upper surface of the upper member 102. A first engine-supporting member 106 is mounted on guide rails 104, 104 fixed to an upper surface of the base plate 103 with sliders 105, 105 interposed therebetween. The position of the first engine-supporting member 106 along the guide rails 104, 104 is capable of being adjusted by changing the position of a bolt 108 threadedly fitted into any of a plurality of bolt bores in a nut member 107 fixed to the base plate 103. A second engine-supporting member 113 and a third engine-supporting member 114 are mounted on guide rails 109 and 110 fixed to the upper surface of the base plate 103 with sliders 111 and 112 interposed therebetween, respectively. The positions of the second and third engine-supporting members 113 and 114 along the guide rails 109 and 111 are capable of being adjusted by changing the positions of bolts 117 and 118 each threadedly fitted in any of a plurality of bolts bores in each of nut members 115 and 116 fixed to the base plate 103.

Therefore, the position of the crankshaft Sc of the engine E can be aligned on a centerline of the pallet P by adjusting the positions of the first, second and third engine-supporting members 106, 113 and 114 depending on the type of the engine E to be mounted on the pallet P. The positioning of the crankshaft Sc of the engine E mounted on the pallet P is achieved by bringing a side of an oil pan into abutment against a stopper 119 fixed to the base plate 103.

The structure of the engine and transmission assembling device CD will be described below with reference to FIGS. 6 to 14.

A pair of slide guides 12, 12 and a lifting and lowering cylinder 13 are supported on a lower surface of a horizontal support plate 11 of a base frame 10 fixed to a floor surface, and a lift table 15 is fixed to upper ends of slide rods 14, 14 vertically slidably fitted in the slide guides 12, 12, and is connected to an output rod 13a of the lifting and lowering cylinder 13, so that it can be lifted and lowered. A slide table 18 is supported on two guide rails 16, 16 fixed to an upper surface of the lift table 15 for movement in a longitudinal direction (a direction toward and away from the engine E) through slide guides 17, 17. The slide table 18 is connected to an output rod 20a of an advancing and retracting cylinder 20 supported on the lift table 15 with a mounting bracket 19 interposed therebetween, so that it can be advanced and retracted.

A support member 21 comprising a combination of a support plate 21a, two reinforcing plate 21b, 21b and a bottom plate 21c is fixed to an upper surface of the slide table 18, and a drive shaft 23 is rotatably supported on a side of the support plate 21a with two bearings 22, 22 interposed therebetween. A slider 25 is vertically slidably carried on a slide guide 24 mounted in a rising manner on an upper surface of the slide table 18, and a rack 25a provided on the slider 25 is meshed with a pinion 26 provided at an intermediate portion of the drive shaft 23. The slide guide 24 has a split groove 24a which opens into an upper surface thereof, and a clearance between the slide guide 24 and the slider 25 is adjusted by clamping two spacers 27, 27 fitted in the split grooves 24a by two bolts 37, 37. The slider 25 supporting the rack 25a is connected to an output rod 29a of a rotating cylinder 29 supported in a turned-up attitude on a lower surface of the slide table 18 with brackets 28, 28 interposed therebetween, so that it can be lifted and lowered.

A longitudinally extending follower shaft 30 is supported at upper ends of two support posts 31, 31 rising on the upper surface of the slide table 18 with bearings 32, 32 interposed therebetween. A drive sprocket 33 mounted at an end of the drive shaft 23 and a follower sprocket 34 mounted at an end of the follower shaft 30 are connected to each other by an endless chain 35, and a tension sprocket 36 supported on a side of a support plate 38 rising on an upper surface of the slide table 18 is meshed with an inner peripheral surface of the endless chain 35. Therefore, when the rotating cylinder 29 is driven in expanding or contracting movement to lift or lower the rack 25a, the drive shaft 23 and the drive sprocket 33 are rotated along with the pinion 26 meshed with the rack 25a. The rotation of the drive sprocket 33 is transmitted to the follower sprocket 34 through the endless chain 35, whereby the follower shaft 30 integral with the follower sprocket 34 is rotated. A power-transmitting path extending from the rotating cylinder 29 to the follower shaft 30 constitutes a drive means D of the present invention.

The follower shaft 30 and the output shaft 40 are connected to each other through an Oldham coupling 41. The Oldham coupling 41 connects a driving cylindrical member 42 fixed to an end of the follower shaft 30 and a follower cylindrical member 44 spline-coupled 43 to the output shaft 40. The output shaft 40 is supported relatively non-rotatably and axially slidably on a shaft portion 44a of the follower cylindrical member 44. The output shaft 40 is biased in a protruding direction by a spring 45 mounted under compression between the output shaft 40 and a front end of the follower cylindrical member 44, and a pin 46 extending through a rear end of the output shaft 40 in a direction perpendicular to an axis L of the follower shaft 30 and the output shaft 40 is slidably fitted into an elongated bore 44b defined in the shaft portion 44a of the follower cylindrical member 44, thereby limiting the range of axial sliding movement of the output shaft 40.

Two first guide pins 47, 47 extending in a direction perpendicular to the axis L are fixed in parallel to the driving cylindrical member 42. To prevent slipping-off of the first guide pins 47, 47, a stationary plate 48 engaged in notches defined in the first guide pins 47, 47 is fixed to an outer surface of the driving cylindrical member 42 by bolts 49, 49. Likewise, two second guide pins 50, 50 extending in a direction perpendicular to the axis L are fixed in parallel to the follower cylindrical member 44. To prevent slipping-off of the second guide pins 50, 50, a stationary plate 51 engaged in notches defined in the second guide pins 50, 50 is fixed to an outer surface of the follower cylindrical member 44 by bolts 52, 52. The two first guide pins 47, 47 fixed to the driving cylindrical member 42 and the two second guide pins 50, 50 fixed to the follower cylindrical member 44 are slidably passed through a guide block 53 accommodated in the driving cylindrical member 42 and the follower cylindrical member 44. The first guide pins 47, 47 fixed to the driving cylindrical member 42 and the second guide pins 50, 50 fixed to the follower cylindrical member 44 are perpendicular to each other as viewed in a direction of the axis L.

Follower cylindrical member-supporting means 63, 63 for retaining the follower cylindrical member 44 coaxially with the driving cylindrical member 42 are provided on the upper surface of the slide table 18. Each of the left and right follower cylindrical member-supporting means 63, 63 has two left and right rods 55 slidably supported on two stays 54, 54 fixed to the upper surface of the slide table 18. The left and right rods 55 extend in a direction pointing to the axis L to form an angle of 90° by each other. Rollers 59, 59 are rotatably supported through roller shafts 58, 58 on the brackets 57, 57 mounted at tip ends of the left and right rods 55 biased in the protruding direction by springs 56.

Therefore, the centerline of the driving cylindrical member 42 is always concentric with the axis L of the follower shaft 30, while the centerline of the follower cylindrical member 44 is movable radially relative to the axis L under the action of the Oldham coupling 41. In this case, the centerline of the follower cylindrical member 44 is always maintained parallel to the centerline of the driving cylindrical member 42, because the two first guide pins 47, 47 are provided on the driving cylindrical member 42 and slidably passed through the guide block 53, and the two second guide pins 50, 50 are provided on the follower cylindrical member 44. The follower cylindrical member 44 is retained concentrically with the driving cylindrical member 42 in a usual state (when no radial load is applied to the output shaft 40) by abutment of the pair of rollers 59, 59 pushing up the follower cylindrical member 44 from the oblique and below against the outer peripheral surface of the driving cylindrical member 42.

A socket 61 hexagonal in section and capable of being engaged into the socket hole h (see FIG. 5) hexagonal in section and provided in the crank pulley Pc is fixed to a flange 60 fixed to a tip end of the output shaft 40 by a plurality of bolts 62. To ensure the smooth engagement of the socket 61 in the socket hole h, a tapered chamfer 61a is provided at a tip end of the socket 61.

Figure 14:
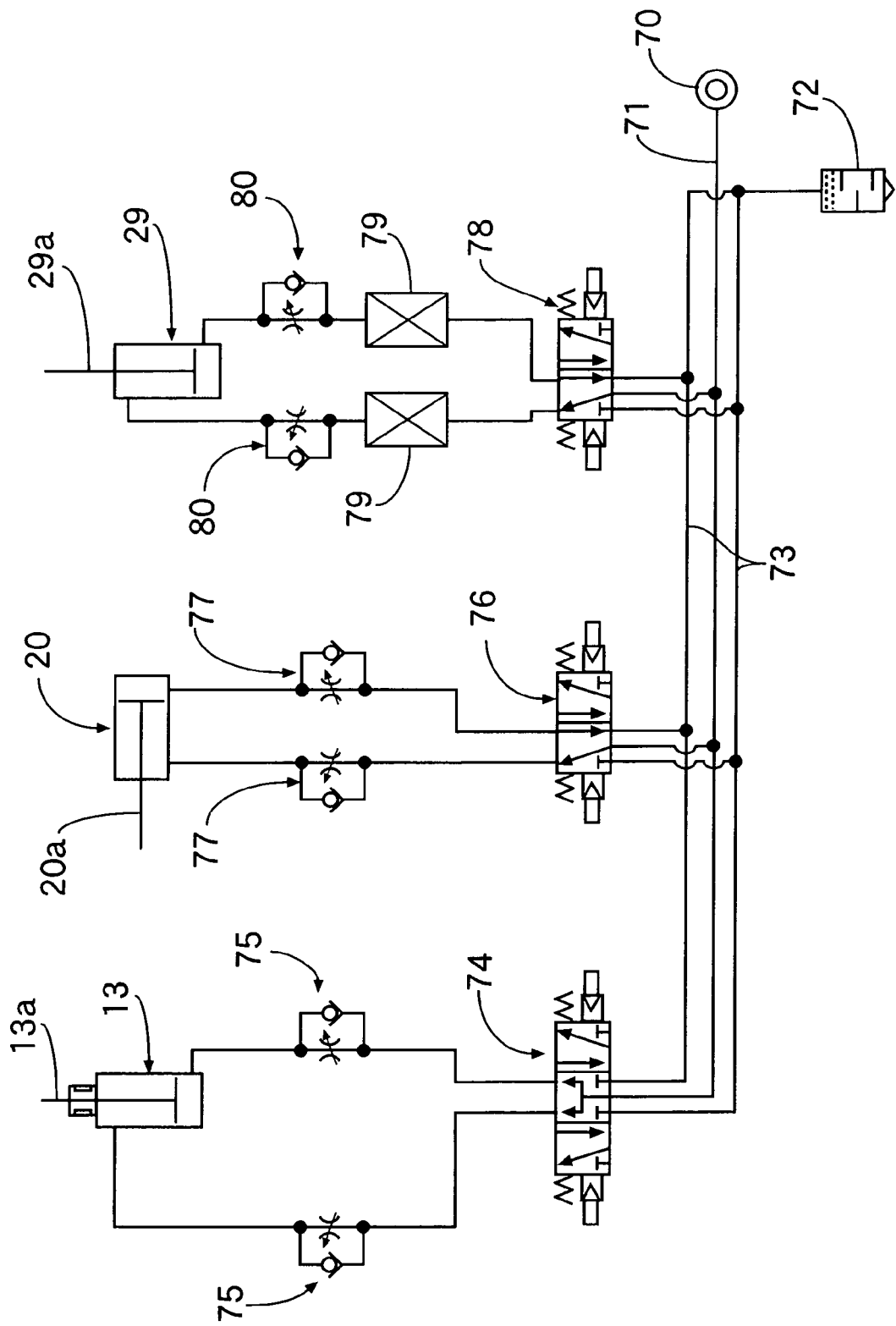

A pneumatic pressure circuit for the lifting and lowering cylinder 13, the advancing and retracting cylinder 20 and the rotating cylinder 29 is shown in FIG. 14. A pilot pressure pipe 71 connected to a pneumatic pressure source 70 and an exhaust pressure pipe 73 connected to a silencer 72 are connected to the lifting and lowering cylinder 13 comprising a pneumatic cylinder through a switchover valve 74 and one-way throttle valves 75, 75. The pilot pressure pipe 71 and the exhaust pressure pipe 73 are connected to the advancing and retracting cylinder 20 comprising a pneumatic cylinder through a switchover valve 76 and one-way throttle valves 77, 77 and are connected to the rotating cylinder 29 comprising a hydraulic cylinder through a switchover valve 78, hydraulic and pneumatic pressure converters 79, 79 and one-way throttle valves 80, 80.

Therefore, when the switchover valve 74 is in a central position shown in FIG. 14, the lifting and lowering cylinder 13 is in a stopped state. When the switchover valve 74 is moved rightwards from the central position, the lifting and lowering cylinder 13 is contracted to lower the lift table 15. When the switchover valve 74 is moved leftwards from the central position, the lifting and lowering cylinder 13 is expanded to lift the lift table 15. In this manner, the level of the lift table 15 can be adjusted to any level depending on the type of the engine E. When the switchover valve 76 is in a right position shown in FIG. 14, the advancing and retracting cylinder 20 is contracted to retract the slide table 18. When the switchover valve 76 is shifted to a left position, the advancing and retracting cylinder 20 is expanded to advance the slide table 18. In this manner, the slide table 18 can be reciprocally moved between a retracted position and an advanced position. When the switchover valve 78 is in a right position shown in FIG. 14, the rotating cylinder 29 is contracted to rotate the output shaft 40 in a clockwise direction. When the switchover valve 78 is shifted to a left position, the rotating cylinder 29 is expanded to rotate the output shaft 40 in a counterclockwise direction. In this manner, the output shaft 40 can be reciprocally rotated between two positions.

When the output shaft 40 is rotated by the rotating cylinder 29, a large static frictional force provided by a repulsing force of the spring 45 is applied to an area of contact between the socket 61 mounted on the output shaft 40 and the socket hole h and hence, the socket 61 and the socket hole h cannot be rotated relative to each other. In order to prevent the rotating cylinder 29 from being operated at a stroke to rotate the output shaft 40 suddenly, when the load of the rotating cylinder 29 is increased to permit the slight relative rotation of the socket 61 and the socket hole h, resulting in sudden decreasing of the coefficient of friction, hydraulic and pneumatic pressure converters 79, 79 are interposed between the pneumatic pressure source 70 and the rotating cylinder 29 in the present embodiment. Thus, the rotating cylinder 29 can be driven at a constant speed by an uncompressible working oil, and the sudden rotation of the output shaft 40 can be prevented. An influence of a difference between the area of a piston of the rotating cylinder 29 adjacent the output rod 29a and the area of the piston on the opposite side from the output shaft 29a can be compensated for by the hydraulic and pneumatic pressure converters 79, 79, and other problems attendant on the compressibility of the air can be eliminated.

The operation of the embodiment of the present invention having the above-described arrangement will be described below.

Referring to FIG. 1, the engine E hung and transported by the hanger He1 of the engine taking-in overhead conveyor Ce1 is placed onto the pallet P at the take-in station Si and transported into the transmission-assembling station Sa by the pallet conveyor Cp. In a synchronism with this, the transmission T hung by the hanger Ht of the transmission taking-in overhead conveyor Ct is transported into the transmission-assembling station Sa.

At this time, the axis of the crankshaft Sc of the engine E supported on the first, second and third engine support members 106, 113 and 114 mounted on the pallet P has been located on the centerline of the pallet P as viewed in a plane by previously adjusting the positions of the first, second and third engine support members 106, 113 and 114. Therefore, when the pallet P is stopped at a predetermined position in the transmission-assembling station Sa, the axis of the crankshaft Sc of the engine E is aligned, as viewed in plane, with the axis of the output shaft 40 of the engine and transmission-assembling apparatus CD mounted in the transmission-assembling station Sa (see FIG. 2). In addition, the level of the output shaft 40 of the engine and transmission-assembling apparatus CD is matched with the level of the crankshaft Sc of the engine E on the pallet P by previously operating the lifting and lowering cylinder 13 to lift or lower the lift table 15.

Even if the axis of the output shaft 40 and the axis of the crankshaft Sc are slightly deviated from each other due to a cause such as the misalignment of the engine E on the pallet P when the advancing/retracting cylinder 20 has been driven from the just-described state to advance the slide table 18 toward the pallet P in order to bring the socket 61 mounted at the tip end of the output shaft 40 into engagement in the socket hole h in the crankshaft Sc, an aligning function for aligning both of the axes with each other by the chamfer 61a formed at the tip end of the socket 61 contacting with the socket hole h is exhibited, whereby a radial reaction force is applied from the socket hole h to the socket 61. As a result, the output shaft 40 is moved radially in parallel to the axis L of the follower shaft 30 through the Oldham coupling 41, whereby the output shaft 30 and the crankshaft Sc are concentrically lined up with each other.

However, the phase of the socket 61 and the phase of the socket hole h are not matched with each other in many cases and hence, it is seldom that the socket 61 is brought into complete engagement in the socket hole h, and the output shaft 40 is retracted into the shaft portion 44a of the follower cylindrical member 44 in response to the advancement of the slide table 18, while compressing the spring 45. Since the rotating cylinder 29 is driven in an extendable manner from this state to conduct the rotation of the follower shaft 30 through a predetermined angle and the stoppage of the follower shaft 30 for a predetermined time alternately and repeatedly, the output shaft 40 eccentric from the follower shaft 30 is rotated intermittently and reciprocally through the Oldham coupling 41, whereby the socket 61 mounted on the output shaft 40 is rotated intermittently and reciprocally, so that the phase thereof is matched with the phase of the socket hole h. Then, the output shaft 40 biased by the repulsing force of the spring 45 is allowed to protrude forwards, whereby the socket 61 is brought into engagement in the socket hole h.

When the rotational direction is changed by intermittently and reciprocally rotating the output shaft 40 in the above manner, the output shaft 40 is decelerated and once stopped, and then rotated again in the opposite direction. Therefore, the chance of engagement of the socket 61 and the socket hole h with each other can be increased to enable the smooth coupling.

Figure 15:
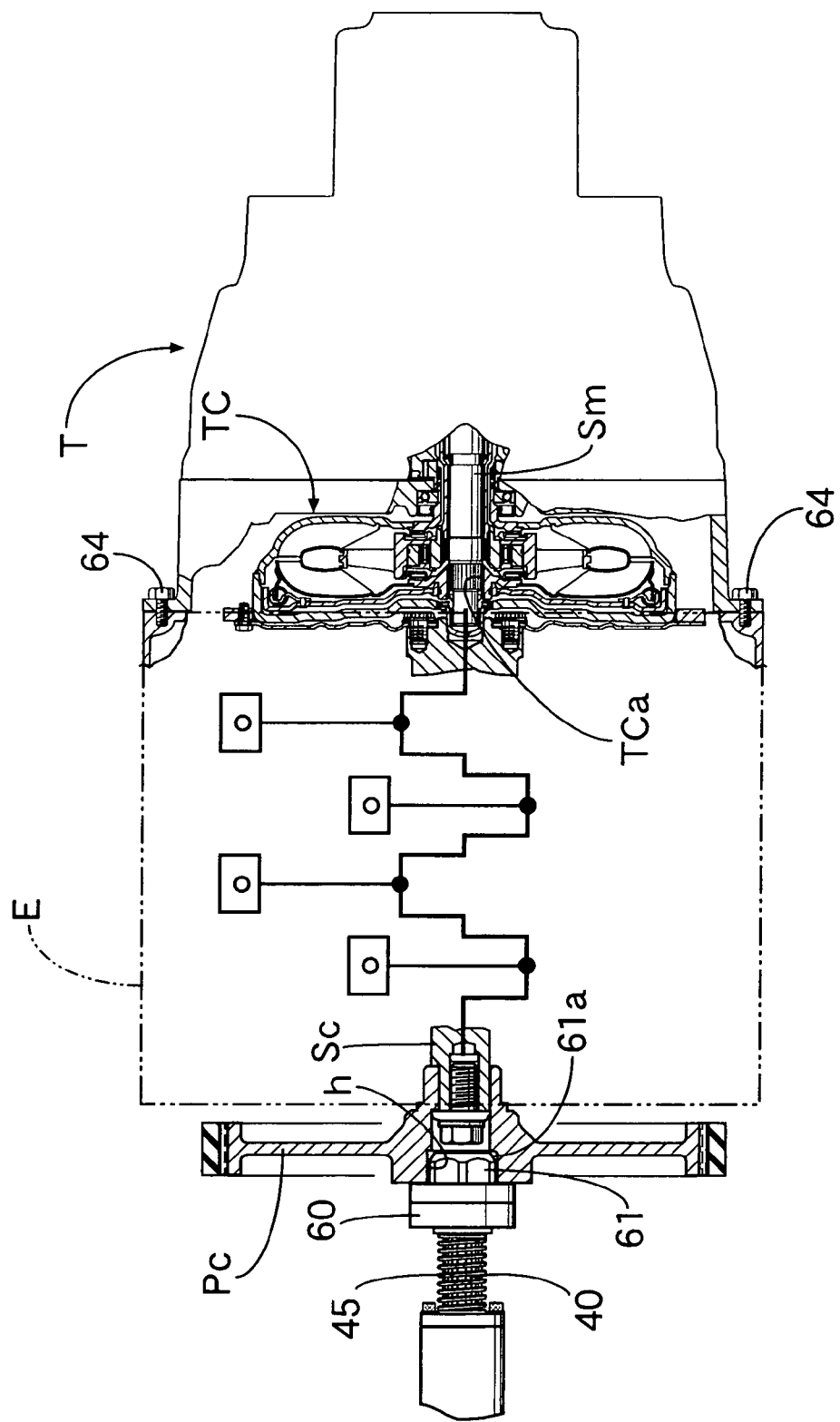

When the socket 61 has been brought into engagement in the socket hole h in the above manner, the end of the main shaft Sm of the transmission T is inserted into the shaft bore TCa in the torque converter TC of the engine E, as shown in FIG. 15, by pushing the transmission T hung by the hanger Ht of the transmission taking-in conveyor Ct by an operator. At this time, the phase of the male spline of the main shaft Sm and the phase of the female spline of the shaft bore TCa are not matched with each other in most cases and in usual, it is seldom that both of the splines are smoothly brought into engagement with each other. Therefore, the rotating cylinder 29 is driven intermettently in an extendable manner to conduct the rotation of the follower shaft 30 through a predetermined angle and the stoppage of the follower shaft 30 for a predetermined time alternately and repeatedly, whereby the crankshaft Sc is rotated intermittently and reciprocally through the follower shaft 30, the Oldham coupling 41, the output shaft 40, the socket 61 and the socket hole h. When the phases of the splines of the crankshaft Sc and the main shaft Sm are thus matched with each other, the crankshaft Sc and the main shaft Sm are brought into complete engagement with each other. Then, the engine E and the transmission T are fastened to each other by the plurality of bolts 64 and in this manner, the operation for assembling the transmission T to the engine E is completed.

As described above, even if there is a somewhat error in the position of the crankshaft Sc of the engine E placed on the pallet P, the output shaft 40 provided with the socket 61 follows the position of the crankshaft Sc to become aligned automatically. Therefore, the socket 61 can be brought into engagement in the socket hole h without troubling the operator, leading to a remarkably enhanced operability.

The engine E having the transmission T assembled thereto is transported to the take-out station So by the pallet conveyor Cp, where the base plate 103 of the pallet P is turned through 90° to change the attitude of the engine E. Then, the engine E is transferred onto the hanger He2 of the engine taking-out overhead conveyor Ce2 for transportation.

Although the embodiment of the present invention has been described in detail, it will be understood that the present invention is not limited to the above-described embodiment, and various modifications in design may be made without departing from the spirit and scope of the invention defined in claims.

For example, the output shaft 40 is intermittently and reciprocally rotated through a rotational angle of 180° in the embodiment, but the rotational angle may be changed to any value. Further, the output shaft 40 may be rotated intermittently in one direction. In this case, an electric motor or the like may be used in place of the rotating cylinder 29.

The chamfer 61a is provided at the tip end of the socket 61 in the embodiment, but a chamfer may be provided at an opening of the socket hole h, or chamfers may be provided at the tip end of the socket 61 and at the opening of the socket hole h, respectively.

The structure of the Oldham coupling 41 for coupling the follower shaft 30 and the output shaft 40 to each other is not limited to that in the embodiment, and other type of a coupling having a similar function may be employed.

INDUSTRIAL APPLICABILITY

The present invention is most effectively applicable to an operation for spline-coupling the end of the main shaft of the transmission assembly into the shaft bore in the crankshaft of the engine assembly, but is applicable to any work body other than the engine body in claims 1 to 4 of the present invention.

What is claimed is:

1. A work-assembling auxiliary device including an engage means capable of being brought into engagement with a to-be-engaged means (h) provided in a crankshaft of an engine to transmit a rotational force of a drive means to said crankshaft of the engine through said engagement means and said to-be-engaged means, thereby spline-coupling a main shaft of a transmission to a torque converter integrally provided on an end of said crankshaft opposite from said to-be-engaged means, characterized in that said work-assembling auxiliary device comprises:
an input shaft connected to said drive means,
an output shaft having said engagement means,
a coupling for connecting said output shaft to said input shaft, so that said output shaft can be moved radially in parallel to said input shaft,
a first repulsively biasing means for biasing said output shaft, so that said output shaft is lined up with said input shaft 30 on a same axis,
a second repulsively biasing means for biasing said engage means in a direction to engage said to-be-engaged means, and
an engaging guide means provided on at least one of said engage means and said to-be-engaged means, said drive means causing the rotation of the input shaft through a predetermined angle and the stoppage of the input shaft for a predetermined time alternately and repeatedly.

2. A work-assembling auxiliary device according to claim 1, wherein said to-be-engaged means is a socket bore defined at the center of a crank pulley.

3. A work-assembling process for assembling an engine and a transmission in a assembling line, characterized in that said process comprises the steps of bringing an engage means connected to a drive means into engagement with a socket bore defined at the center of a crank pulley provided on one of ends of a crankshaft of an engine, and conducting the rotation of said crankshaft through a predetermined angle and the stoppage of said crankshaft for a predetermined time alternately and repeatedly by said drive means, thereby spline-coupling the other end of said crankshaft and an end of a main shaft of a transmission to each other.

4. A work-assembling process according to claim 3, wherein a torque converter is integrally provided at the other end of the crankshaft, and a shaft bore in the torque converter and the end of the main shaft are spline-coupled to each other.

* * * * *